United States Patent [19]

Sandorff

[11] Patent Number: 4,458,865
[45] Date of Patent: Jul. 10, 1984

[54] NOSE-TORQUER ELECTRO-IMPULSE DEICING SYSTEMS

[75] Inventor: Paul E. Sandorff, Granada Hills, Calif.

[73] Assignee: Lockheed Corporation, Burbank, Calif.

[21] Appl. No.: 441,479

[22] Filed: Nov. 15, 1982

Related U.S. Application Data

[62] Division of Ser. No. 214,541, Dec. 9, 1980, Pat. No. 4,399,967.

[51] Int. Cl.³ .............................................. B64D 15/18
[52] U.S. Cl. ................................................. 244/134 R
[58] Field of Search ......................... 244/134 A, 130; 60/39.09 D; 335/219, 233, 285; 310/15.27; 416/95; 318/132

[56] References Cited

U.S. PATENT DOCUMENTS

| 1,819,497 | 8/1931 | Chisholm . | |
| 2,037,626 | 4/1936 | Hall | 244/12 |
| 2,135,119 | 11/1938 | Wood | 244/134 |
| 2,201,155 | 5/1940 | Burgess | 244/134 |
| 2,271,466 | 1/1942 | Schmidt et al. | 244/134 A |
| 2,297,951 | 10/1942 | Frank | 244/134 |
| 2,532,876 | 12/1950 | Asche et al. | 172/126 |
| 2,872,987 | 2/1959 | Cahagan | 170/159 |
| 3,549,964 | 12/1970 | Levin | 317/262 |
| 3,672,610 | 6/1972 | Levin | 244/134 R |
| 3,779,488 | 12/1973 | Levin | 244/134 A |
| 3,809,341 | 5/1974 | Levin | 244/134 R |

FOREIGN PATENT DOCUMENTS

| 505433 | 5/1939 | United Kingdom | 244/134 R |
| 523108 | 7/1940 | United Kingdom | 244/134 A |

*Primary Examiner*—Galen L. Barefoot
*Attorney, Agent, or Firm*—Frederic P. Smith

[57] ABSTRACT

The invention is a nose-torquer electromagnetic pulse deicing system for airfoil surfaces. A deflection wave mode deformation is generated in the skin (14) by activation of two electromagnetic coils (42). The coils (42) form part of a nose-torquer mechanism (40) which includes cantilever levers (46) and (47). The cantilever levers (46) and (47) are secured to the nose-section (44) of the airfoil. The coils (42), when electrically activated, cause a torsional wave deformation of the skin (14) as a result of opposite relative rotation between the levers (46) and the lever (47) about the nose-section (44).

4 Claims, 16 Drawing Figures

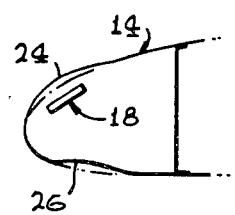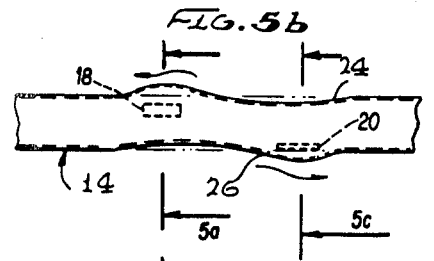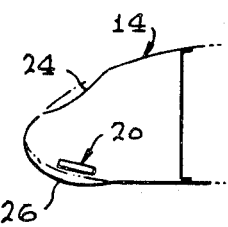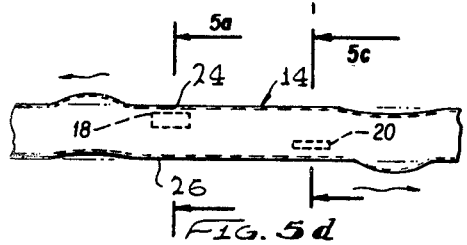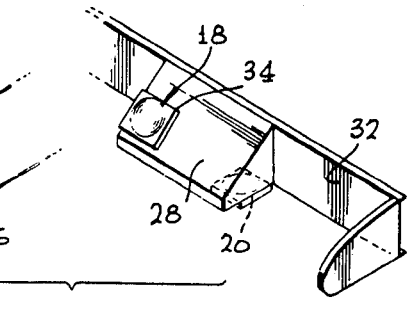

NOSE-TORQUER ELECTRO-IMPULSE DEICING SYSTEMS

This application is a division of application Ser. No. 214,541 filed Dec. 9, 1980 now U.S. Pat. No. 4,399,967.

TECHNICAL FIELD

The invention relates generally to electromagnetic pulse deicing systems, and in particular, to electromagnetic pulse deicing systems which generate torsion forces in the nose of an airfoil and unsymmetrical bulging of the airfoil skin.

BACKGROUND ART

Various approaches to removing ice from aircraft surfaces have been tried. In one approach, an airfoil surface shape is altered by utilization of parasitic elements. This particular approach is exemplified in U.S. Pat. No. 2,297,951to Frank, U.S. Pat. No. 2,201,155 to Burgess and U.S. Pat. No. 2,872,987 to Gahagan. In the '951 patent to Frank, a flexible strip is mounted to a wing leading edge, and is flexed by a plurality of rollers in order to remove ice. The '155 patent discloses a flexible skin arranged over the leading edge of a wing such that the skin may be flexed by operation of ballrollers, friction links, pistons and the like. In the '987 patent a spar is provided in running arrangement through a wing. When the spar is flexed in a vertical direction, a plurality of vertical wing sections are rocked causing the wing to flex.

In the spar arrangement of the '987 patent, a high price is paid in structural efficiency since the spar, which carries wing loads, must be designed within a much smaller envelope than is the case with conventional stressed skin structures. In addition, the airfoil segments constitute additional weight and can carry none of the spanwise bending or axial load. The '951 and '155 patents also involve operation of devices and elements which provide little or no structural purpose but which are parasitic to the basic wing structure and covering. These parasitic elements are undesirable in that they represent large additional weight without performing primary structural functions.

Two systems intended to operate by altering or deforming wing surfaces are described in U.S. Pat. No. 2,037,626 to Hall and U.S. Pat. No. 2,135,119 to Wood. The '626 patent utilizes a mechanical device to modify the contour of the leading edge of an airfoil during flight primarily to control wing characteristics and give the wing a lift curve of desired shape, but also for the purpose of breaking up and removing ice. A longitudinal member mounted in the leading edge of the wing is projected or retracted to alter the wing leading edge contour. In the '119 patent, a plurality of slats or vibrators are mounted on the leading edge of a wing. The slats are vibrated relative to each other to prevent formation of or to break-up ice on the wing surface.

Tests have shown that ice deposited on airfoil surfaces in flight adheres strongly to the surface, even when such surfaces are of so-called "hydrophobic" materials (as, for example, polyethylene and teflon). Because of this effect it is seldom sufficient for the surface to be simply vibrated, as in the '119 patent, or generally deformed or altered, as in the '626 patent, in order to dislodge ice. An appreciable surface distortion must be-introduced, of a type which produces high shearing stress at the interface between the ice and the airfoil surface sufficient to exceed the adhesion or bond strength. This can be accomplished by large deflections effected over a long span, or by small deflections effected over a short span, the significant quantity being the change in the local radius of curvature of the surface, as this is directly related to the magnitude of the shearing stress introduced into the ice-to-airfoil surface bond. As a result, these concepts cannot be implemented to practical advantage. On the one hand, large deflections require a flexible surface which is inefficient structurally for carrying the primary air loads and wing bending loads, and thus is heavy and unattractive. On the other, small local defections may be introduced mechanically or by activators as described in the '119 patent into more rigid surfaces such as those desired for efficient wing construction, but these actuators must be numerous and powerful to achieve the required defection over short spans, and thus will comprise undesirable additional weight.

Another approach to removing ice from airfoil surfaces is disclosed in U.S. Pat. No. 1,819,497 to Chisholm, which discloses the use of electrical energy to generate heat in the airfoil surface to raise the temperature and cause the ice to loosen and be blown off. Removal of ice through mechanical action (bond failure) which causes the bond strength between the ice and the airfoil to be exceeded, has been shown to be a more efficient ice removal system with respect to energy requirements than the heating system of the '497 patent. In addition, such heating systems are particularly less efficient at low temperatures, when energy requirements of simple heating systems become very large.

Somewhat more promising deicing systems are the electromagnetic inductive pulse deicing systems for deicing airfoil surfaces by bringing about localized elastic deformation of the surface of the airfoil. See for example, the various systems disclosed in U.S. Pat. No. 3,549,964 to Levin el al and British patent specification 505,433 to Goldschmidt. The '964 patent discloses means for transforming electric current pulses separated by time intervals into mechanical power pulses. The system includes wire loops connected to a current pulse source which are positioned in close proximity to the surface of the airfoil to be deiced. A primary current is produced in the wire loops while current is induced by electromagnetic induction flow through the airfoil surface. Pulses of mechanical force normal to the surface result from the interaction between the magnetic field of the loop primary current and the induced current in the airfoil surface, which pulses cause elastic deformations of the surface to remove ice therefrom. The British patent broadly discloses utilization of pulsating electromagnetic forces between conducting sheets of an airfoil. Alternating or pulsating electrical currents are caused to flow in parallel or opposite directions in the sheets, the electromagnetic interactions causing vibration and/or wavelike deformation of the outer sheet, which might for example make up the leading edge of an airfoil. Examples of electrical pulse distribution systems which may be utilized in conjunction with electromagnetic inductive pulse deicing systems may be found in U.S. Pat. No. 3,672,610 and 3,779,488 both to Levin, as well as, in a somewhat more primitive form, in the '433 British specification.

Both the '964 patent and the British patent generally describe wave-type deformation which emanates from the point or area of the mechanical impulse. The wave propagation from these types of systems has been found torsional travelling wave in the leading edge of the blade.

The novel features which are believed to be characteristic of the invention, both as to its organization and its method of operation, together with further objects and advantages thereof, will be better understood from the following description, taken in connection with the accompanying drawings in which presently preferred embodiments of the invention are illustrated by way of example. It is to be expressly understood, however, that the drawings are for purposes of illustration and description only and are not intended as a definition of the limits of the invention.

BRIEF DESCRIPTION OF DRAWINGS

FIGS. 5a and 5c are cross-sectional views taken on the lines 5a—5a and 5c—5c of FIG. 3, respectively showing the upper and lower initial skin bulge of the staggered coil arrangement of the present invention;

FIG. 5b is a front view of FIGS. 5a and 5b showing the upper and lower wing surface wave propagation for the staggered coil arrangement of FIG. 3 at the moment of the initial impulse;

FIG. 5d is a front view of FIGS. 5a and 5c showing the upper and lower wing surface wave propagation for the staggered coil arrangement of FIG. 3 at a later moment in time;

FIG. 6 is an exploded perspective view of a portion of a wing leading edge section, showing a staggered impulse coil arrangement in accordance with the present invention;

BEST MODE OF CARRYING OUT THE INVENTION

Figure 1:
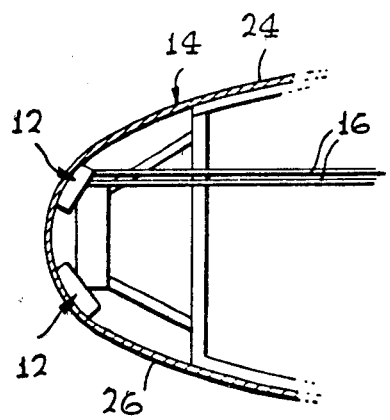
FIG. 1 is a diagrammatic cross-sectional view of a prior art system for generating electromagnetic field pulses close to sheet metal sheathing.

One form of electromagnetic pulse aircraft wing surface deicing system is described in the aforementioned U.S. Pat. No. 3,549,964 to Levin et al. Referring to FIG. 1, an electromagnetic inductive pulse system in accordance with the '964 patent operates by suddenly and elastically deforming the structural skin (14) of an aircraft wing leading edge with electromagnetically induced impulses produced when a capacitor (not shown) is discharged via a conductor (16), through the coils (12) that are placed in close proximity to the skin (14).

In some prior art electromagnetic pulse deicing systems, one coil is used at any one spanwise station, but in those instances when two coils are used, they are generally located above and below each other acting on upper and lower surfaces of the wing leading edge. Such a prior art positioning of coils is depicted in FIG. 2.

Figure 3:
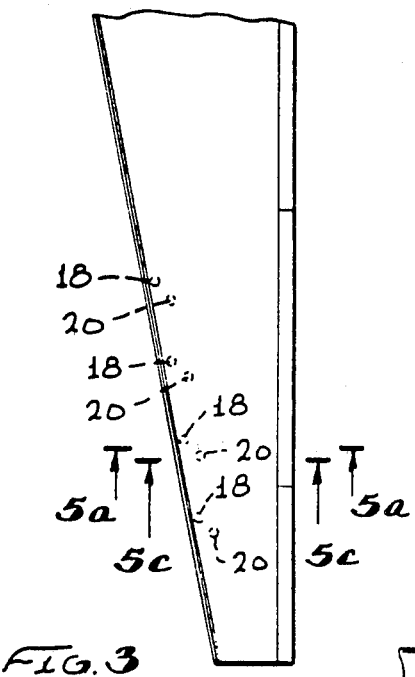
FIG. 3 is a top plan view, of an aircraft wing leading edge portion showing a staggered wing impulse device arrangement in accordance with a first embodiment of the present invention.

In accordance with a first embodiment of the present invention, as shown in FIG. 3, sets of upper and lower coils (18) and (20) are positioned in a staggered geometrical arrangement along the wing (22).

Figure 2:
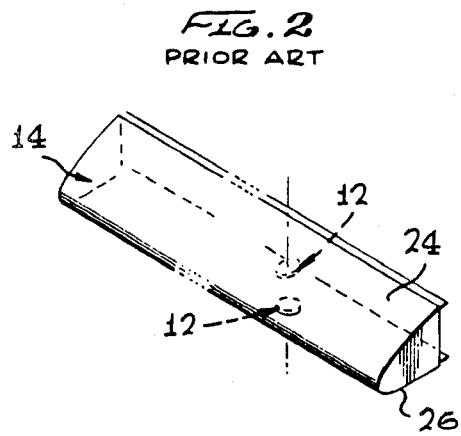
FIG. 2 is a perspective view of an aircraft wing leading edge portion showing in phantom two vertically aligned prior art electromagnetic field pulse producing devices positioned at a single spanwise wing location.
Figure 4A:
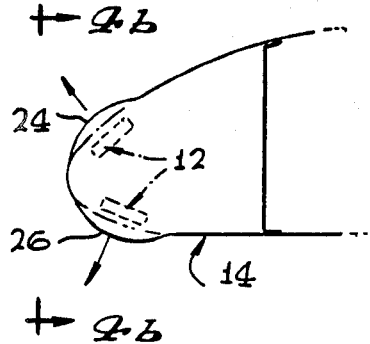
FIG. 4a is a diagrammatic side view of the prior art impulse devices of FIG. 2.
Figure 4B:
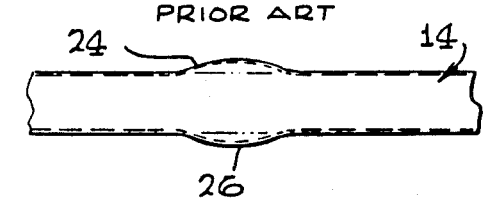
FIG. 4b is a view taken on line 4b—4b of FIG. 4a, showing wing leading edge skin deformation at the moment of the initial impulse.
Figure 4C:
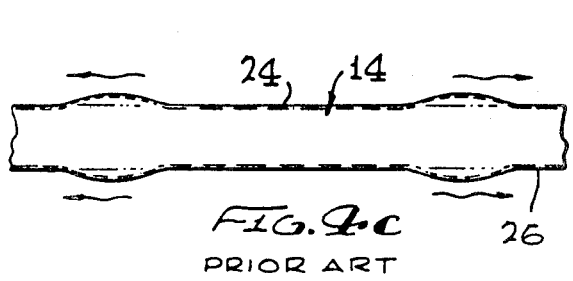
FIG. 4c is a view taken on line 4b-4b of FIG. 4a, showing upper and lower wing surface wave propagation for the prior art impulse system of FIG. 2 after the initial impulse.

In the prior art arrangement depicted in FIGS. 1 and 2, actuation of the coils (12) produces a symmetrical local bulging of the upper and lower skin surfaces (24) and (26), as shown in exaggerated form in FIGS. 4a, 4b, and 4c. These suddenly imposed deformations initiate spanwise-propagating waves in the skin (14), as indicated by FIG. 4c. The wave-like disturbances produce ice removal at some distance from the station where the impulse is applied, so that a reasonable coil (12) spacing may be employed.

It is to be understood that the wave-like deformation is depicted here only schematically, inasmuch as the actual disturbance is propagated as a wave packet which is subject to dispersion, in combination with lateral reflections, and attenuation, which modify the wave structure and strength.

The staggered coil arrangement of the present invention, as depicted in FIG. 3, causes an unsymmetrical deformation and wave form exemplified in FIGS. 5a, 5b, 5c, and 5d. In this mode, the same or greater amplitude of deformation is achieved as in the prior art symmetrical case, but with lower stresses at the critical nose of the section, and with a lower force input necessary from the coils (18) and (20). Thus, it has been found to be advantageous to excite the upper and lower wing surfaces in a complementary mode, one surface bulging inward while the other is bulging outward. This has been found to be readily accomplished by positioning the exciting coils (18) and (20) approximately one-half wave length spanwise with respect to each other. Under such an arrangement, high stress conditions occurring at the nose will be avoided and much larger deformations will be obtained for the same electrical energy input.

The upper and lower coils (18) and (20) are shown in FIG. 6 secured to a support element (28) in a staggered geometrical arrangement. The support element is shown affixed to a wing beam web (32), but it should be readily understood that any means for fixing the position of the coils (18) and (20) relative to the skin (14) so as to Provide a fixed gap therebetween would be suitable. The upper coil (18) is shown in FIG. 6 to be a pancake-type coil embedded in a portion (34) of the support element (28), but again any suitable type of impulse deicing device of speed sufficient to excite wave action in the surface structure may be utilized.

Use of doubler plates (36), such as doubler plates described in the aforementioned co-pending U.S. patent application Ser. No. 214,489 would enhance the operation of the staggered-coil deicing arrangement of the present invention, and would make the invention utilizable and efficient with moderate to high resistivity airfoil materials, as for example composite materials, titanium, steel and the like. As an alternative to use of the doubler plates (36), a pancake coil or other coil may be attached to or be embedded in the skin (14), also as described in the aforementioned copending application, the disclosure of which is hereby incorporated by reference herein.

By positioning the upper and lower surface coils at separated spanwise stations and actuating them simultaneously, complementary wave forms can be excited in the upper and lower surfaces which result in larger amplitude and lower stress at the nose section.

It should be readily apparent that various other coil arrangements could be provided to excite a torsional wave mode in the wing skin structure (14). For example, a system utilizing three coils could be utilized wherein two of the coils could be located approximately a full wave-length apart in proximity to the upper surface, while the third was located along the lower surface at an intermediate spanwise station. Alternatively, if the electrically powered skin-mounted coils mentioned in the aforementioned U.S. patent application Ser. No. 214,489 were used, impulse-producing pairs could be located at the same spanwise station, with one pair electrically connected to produce repulsive and the other attractive force.

Figure 7:
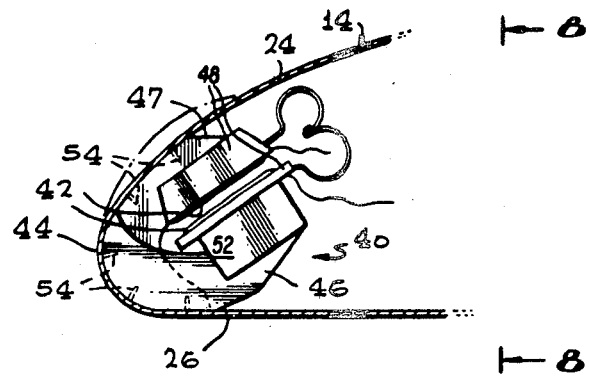
FIG. 7 is a cross-sectional view through a wing leading edge portion showing a nose-torquer electromagnetic Pulse deicing mechanism in accordance with another embodiment of the present invention.
Figure 8:
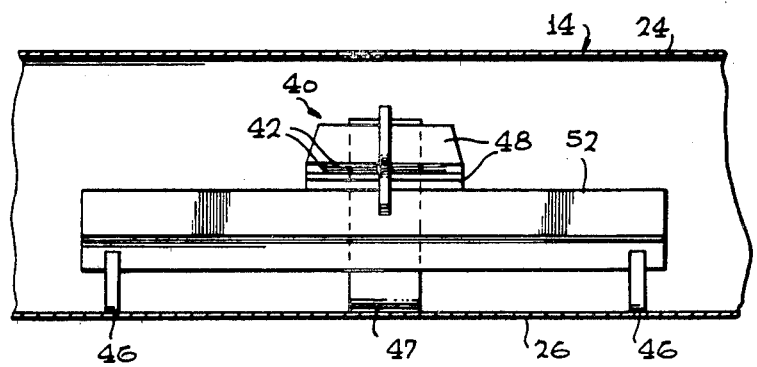
FIG. 8 is a view taken on the line 8—8 of FIG. 7.

FIGS. 7 and 8 depict yet another embodiment of the present invention, wherein a nose-torquer mechanism (40) is utilized in conjunction with electro-impulse power means or coils (42) to introduce torsion into the nose section (44) of the wing skin (14).

The mechanical apparatus includes three cantilevers (46) and (47) supported internally on the curved nose (44) of the leading edge and extending normal to it, which operate to introduce torsion into the nose section (44) and to initiate a traveling wave of torsional deformation that propagates spanwise. The cantilevers (46) and (47) are activated by the pair of coils (42) which are shown electrically connected in series. The electrical power may be supplied, as in the case of the prior art electromagnetic inductive pulse deicing systems, by the discharge of energy stored in a capacitor or capacitors (not shown), or by any other means or source of electric power, as such source does not constitute a port of the present invention.

The skin deflection brought about by the FIG. 7 and 8 embodiment can best be described as a torsional deflection. That is, the nose-torquer mechanism applies a torsional moment or couple to the cantilevers (46) and (47) which are attached each along a line or at multiple points to the curved leading edge; the torsional moment is reacted at one or preferably two other similar structural attachments resulting in torsional shearing deformation.

The coils (42) are shown mounted to and within support elements (48), the upper one of which is secured to the cantilever (47), and the lower one of which is secured, in any suitable manner, to the rigid cross-beam (52). The cross beam (52) is mounted to the leading edge skin (14) by the two cantilevers (46), which are spaced from and located one on each side of the cantilever lever (47). The cantilevers (46) and (47) are secured to the nose-section (44) of the leading edge portion, in this embodiment, by a series of rivets (54). When electrical power is delivered to the coils (42), they repel each other, causing a torsional wave to be introduced into the nose section (44), thereby causing ice on the wing leading edge section to be removed.

The cross-beam (52) should be of sufficient length for purposes of efficiency in delivering a torsional deformation of proper wave length, but should of course be limited in size because of beam flexibility and weight, which affect dynamic response and tend to reduce the impulsiveness of the transmitted forces. Thus, a compromise should be made depending on types of beam materials used, type of skin material, coil sizes, etc. Spans of approximately four (4) (10.16 cm) inches between the levers (46) and (47) have been found to be appropriate for an aluminum alloy skin of 0.060 inch thickness and a laminated graphite epoxy beam of one inch square cross-section.

Figure 9:
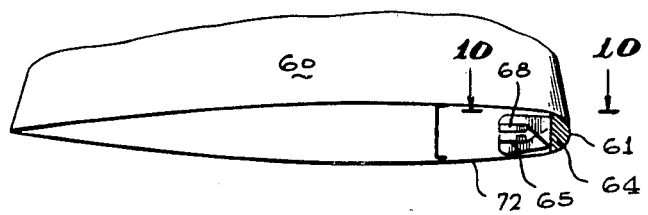
FIG. 9 is a perspective view of a helicopter blade cross-section employing an electromagnetic pulse deicing system in accordance with yet another embodiment of the present invention.
Figure 10:
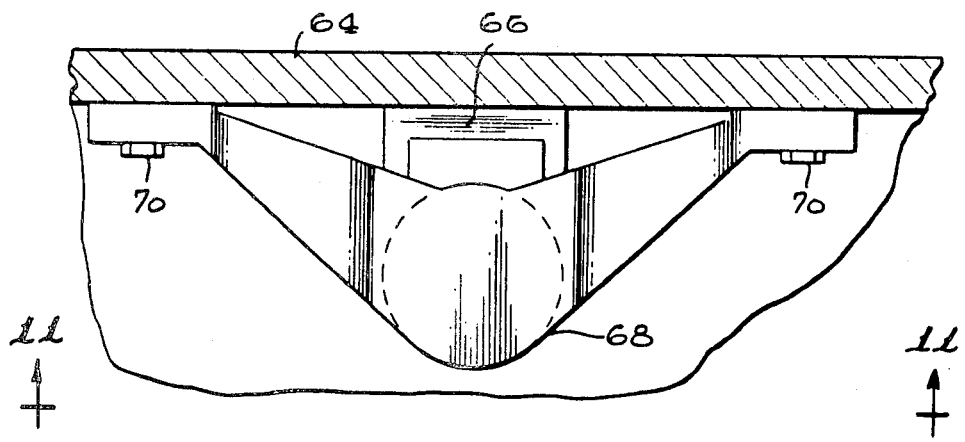
FIG. 10 is a view taken on line 10—10 of FIG. 9.
Figure 11:
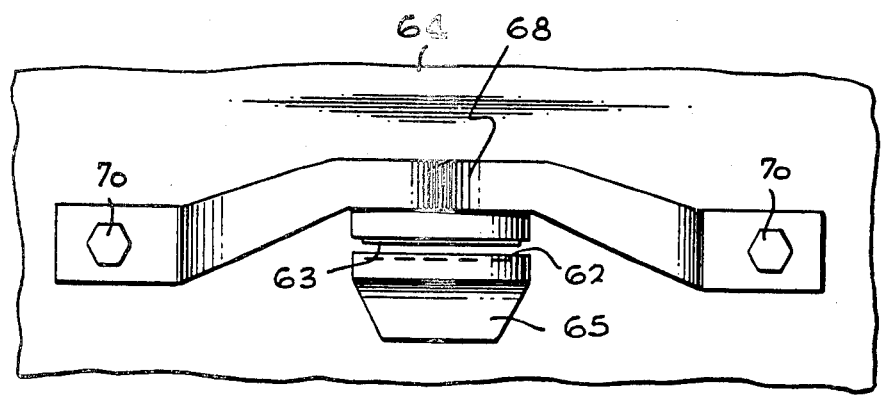
FIG. 11 is a view taken on line 11—11 of FIG. 10. In the various drawing figures, like numerals deplict like parts.

In FIGS. 9–11, a nose torquer mechanism in accordance with another embodiment of the present invention is shown installed in a helicopter blade (60). A pair of electromagnetic coils (62) and (63) are mounted within the helicopter blade (60) in such a manner that when both coils are energized, a twisting movement will be imparted to the nose (61) of the blade, which initiates a spanwise travelling wave. One of the coils (62) is mounted in a support element (65) that is secured to a cantilevered lever (66). The lever (66) is tied to a leading edge reinforcement (64) that runs spanwise with the nose (61) of the blade (60). This nose reinforcement (64) is a common construction in helicopter blade design, its primary purpose being to serve as mass balance. The second coil (63) is mounted on a beam (68) that is secured via bolts (70) to the mass balance bar (64) and is positioned electrically within the magnetic field of the first coil (62) so that when both coils are energized, a strong interaction exists (either attracting or opposing). Since the mass balance bar (64) is held mechanically within the blade skin (72), the torsion imparted to it will be transferred directly to the skin, twisting both the upper and lower skins and producing a torsional travelling wave.

While the staggered coil and nose-torquer electromagnetic pulse deicing systems of the present invention have been described with reference to particular embodiments, it should be understood that such embodiments are merely illustrative as there are numerous variations and modifications which may be made by those skilled in the art. Thus, the invention is to be construed as being limited only by the spirit and scope of the appended claims.

INDUSTRIAL APPLICATION

The staggered coil and nose-torquer electromagnetic pulse deicing systems of the present invention are useful for the efficient removal of ice from surfaces, and in particular, for the efficient removal of ice from airfoil skins constructed of materials such as aluminum, aluminum alloys, titanium, steel, laminated composites, and the like as a result of torsional travelling deformation waves introduced into the skins.

I claim:

1. A deicing system for deicing the surface skin of an airfoil, said airfoil including a leading edge portion having upper and lower surfaces terminating at a leading edge, said system comprising a nose-torquer mechanism secured to said leading edge for generating a deflection wave mode deformation in said skin which involves torsion of said leading edge and unsymmetrical bulging of said upper and lower surfaces, said nose-torquer mechanism comprising:

a first cantilever arm having a first end attached to said leading edge at a first spanwise location;

a first pulse generating element attached to a second end of said first cantilever arm, said first cantilever arm extending from said leading edge to an interior region of said airfoil intermediate said upper and lower surfaces;

a second cantilever arm secured at a second spanwise location along said airfoil leading edge;

a second pulse generating element arranged in close proximity to said first pulse generating element, said second pulse generating element being secured to said second cantilever arm; and a third cantilever arm secured at one end to said second pulse generating element and secured at its other end to said leading edge at a third spanwise location said first spanwise location being intermediate said second and third spanwise locations.

2. The deicing system of claim 1 wherein said first and second cantilever arms are arranged so as to rotate in opposite directions relative to said air foil leading edge upon operation of said first and second pulse generating elements.

3. The deicing system of claim 2 wherein said second and third cantilever arms are arranged so as to rotate in the same direction relative to said airfoil leading edge.

4. The deicing system of claim 1 wherein said first and second pulse generating elements comprise an electromagnetic coil and said system further includes means for electrically activating said coil to thereby apply a rotational torque about said leading edge which initiates said deflection wave mode deformation of said skin.

* * * * *